(12) United States Patent
Lee et al.

(10) Patent No.: US 9,692,022 B2
(45) Date of Patent: Jun. 27, 2017

(54) RECHARGEABLE BATTERY

(71) Applicant: Samsung SDI Co., Ltd., Yongin-si, Gyeonggi-do (KR)

(72) Inventors: Chi-Young Lee, Yongin-si (KR); Myung-Jae Jang, Yongin-si (KR)

(73) Assignee: Samsung SDI Co., Ltd., Yongin-Si (KR)

( * ) Notice: Subject to any disclaimer, the term of this patent is extended or adjusted under 35 U.S.C. 154(b) by 122 days.

(21) Appl. No.: 14/860,567

(22) Filed: Sep. 21, 2015

(65) Prior Publication Data

US 2016/0260940 A1    Sep. 8, 2016

(30) Foreign Application Priority Data

Mar. 2, 2015 (KR) ........................ 10-2015-0029332

(51) Int. Cl.
*H01M 2/04* (2006.01)
*H01M 2/02* (2006.01)

(52) U.S. Cl.
CPC ....... *H01M 2/0426* (2013.01); *H01M 2/0439* (2013.01); *H01M 2/0456* (2013.01); *H01M 2/024* (2013.01); *H01M 2/0217* (2013.01); *H01M 2/0473* (2013.01)

(58) Field of Classification Search
None
See application file for complete search history.

(56) References Cited

U.S. PATENT DOCUMENTS

2012/0009466 A1    1/2012    Jang

FOREIGN PATENT DOCUMENTS

KR    10-2004-0026260 A    3/2004
KR    10-2012-0006232 A    1/2012

*Primary Examiner* — Patrick Ryan
*Assistant Examiner* — Wyatt McConnell
(74) *Attorney, Agent, or Firm* — Knobbe Martens Olson & Bear LLP

(57) ABSTRACT

A rechargeable battery that reduces a production cost by reducing a number of processes of a case is provided. The rechargeable battery includes: a case that houses an electrode assembly; a cap plate that is coupled to an opening of the case; and an electrode terminal that is electrically connected to the electrode assembly to be provided in the cap plate, wherein the cap plate has an inclined portion at a side surface of an outer edge and a modified groove at a corner of an outer surface and is coupled to the opening with the inclined portion while the modified groove becomes narrow.

12 Claims, 10 Drawing Sheets

RECHARGEABLE BATTERY

RELATED APPLICATIONS

This application claims priority to and the benefit of Korean Patent Application No. 10-2015-0029332 filed in the Korean Intellectual Property Office on Mar. 2, 2015, the entire contents of which are incorporated herein by reference.

BACKGROUND

Field

The present invention relates to a rechargeable battery in which a cap plate is coupled and welded to an opening of a case.

Description of the Related Art

A rechargeable battery can repeatedly perform charge and discharge, unlike a primary battery. A rechargeable battery of a small capacity is used for a small portable electronic device like a mobile phone or a laptop computer and a camcorder, and a rechargeable battery of a large capacity is used as a power source for driving a motor of a hybrid vehicle and an electric vehicle For example, a rechargeable battery includes an electrode assembly that performs a charge and discharge operation, a case that houses the electrode assembly and an electrolyte solution, a cap plate that is coupled to an opening of the case, and an electrode terminal that is installed at the cap plate to be electrically connected to the electrode assembly.

The case has a step corresponding to the cap plate in the opening. When placing and welding the cap plate in the opening of the case, the step may prevent the cap plate from falling inside of the case. However, by adding a production process of the case, the step increases production cost.

Due to the step, the opening of the case is formed with a thin thickness. Therefore, a crack may occur in the case, and when a crush or drop occurs, the step portion may be broken by physical impact. That is, in a welding process of the case and the cap plate, a defect rate may increase.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present invention has been made in an effort to provide a rechargeable battery having advantages of decreasing a production cost by reducing a number of processes of a case. The present invention has been made in an effort to further provide a rechargeable battery having advantages of reducing a coupling and welding failure of a case and a cap plate.

An exemplary embodiment of the present invention provides a rechargeable battery including: a case that houses an electrode assembly; a cap plate that is coupled to an opening of the case; and an electrode terminal that is electrically connected to the electrode assembly to be provided in the cap plate, wherein the cap plate has an inclined portion at a side surface of an outer edge and a modified groove at a corner of an outer surface and is coupled to the opening with the inclined portion so that the modified groove has an inclined inner wall that corresponds to the inclined surface of the cap plate.

The modified groove may be provided at four locations of a quadrangle corner of the cap plate.

The modified groove may form a greater groove gap at the center of the corner, form a smaller groove gap at both sides, and gradually reduce a groove gap while advancing from the center to both sides, before coupling.

The cap plate may further include a protruding portion corresponding to the groove gap at an outer edge of the modified groove. The protruding portion may be inserted into an opening of the case so that the modified groove becomes narrow.

The opening of the case may have a corresponding modified inclined surface that is obliquely modified to correspond to the inclined portion.

The modified groove may include: a first internal side wall and second internal side wall that are formed opposite at the inside and the outside at the outer surface; and a bottom portion that connects the bottom of the first internal side wall and the second internal side wall.

The inclined portion may form a first inclined portion that is produced in a straight line and that is bent to correspond to an intersection of the first internal side wall and the bottom portion when coupling to the opening to closely contact the opening and a second inclined portion that is bending-connected to the first inclined portion to be separated from the opening.

The inclined portion may be formed at an entire side surface of an outer edge of the cap plate. The modified groove may be formed along an entire circumference of the outer surface.

The opening of the case may have a corresponding modified inclined surface that is obliquely modified to correspond to the inclined portion. The corresponding modified inclined surface may be formed along an entire circumference of the opening.

According to an exemplary embodiment of the present invention, by providing an inclined portion at a side surface of an outer edge of a cap plate and a modified groove at a corner of an outer surface, the cap plate is coupled to the modified groove to an opening of a case and thus a number of processes of the case is reduced and a production cost is thus reduced. While an inclined portion of the cap plate forms a corresponding modified inclined surface in an opening of the case, the inclined portion is welded to the opening by forced fitting and thus a coupling and welding failure of the case and the cap plate can be reduced.

DETAILED DESCRIPTION OF CERTAIN INVENTIVE EMBODIMENTS

Figure 1:
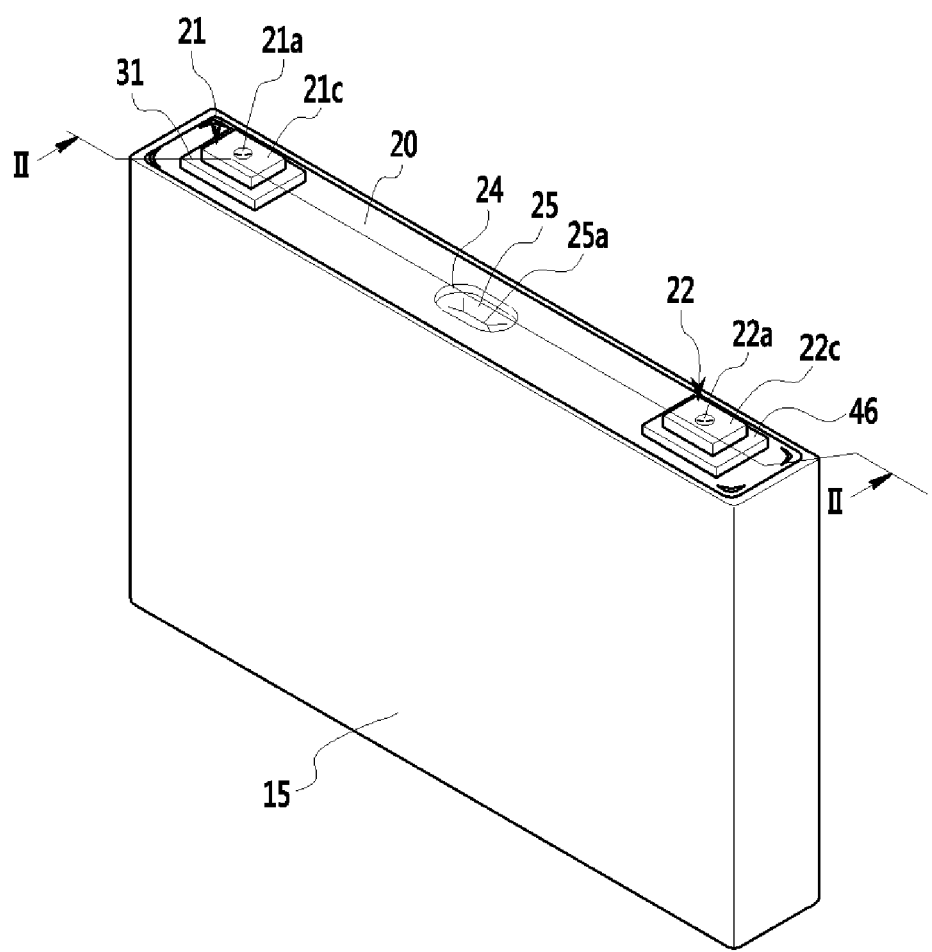
FIG. 1 is a perspective view illustrating a rechargeable battery according to a first exemplary embodiment of the present invention

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
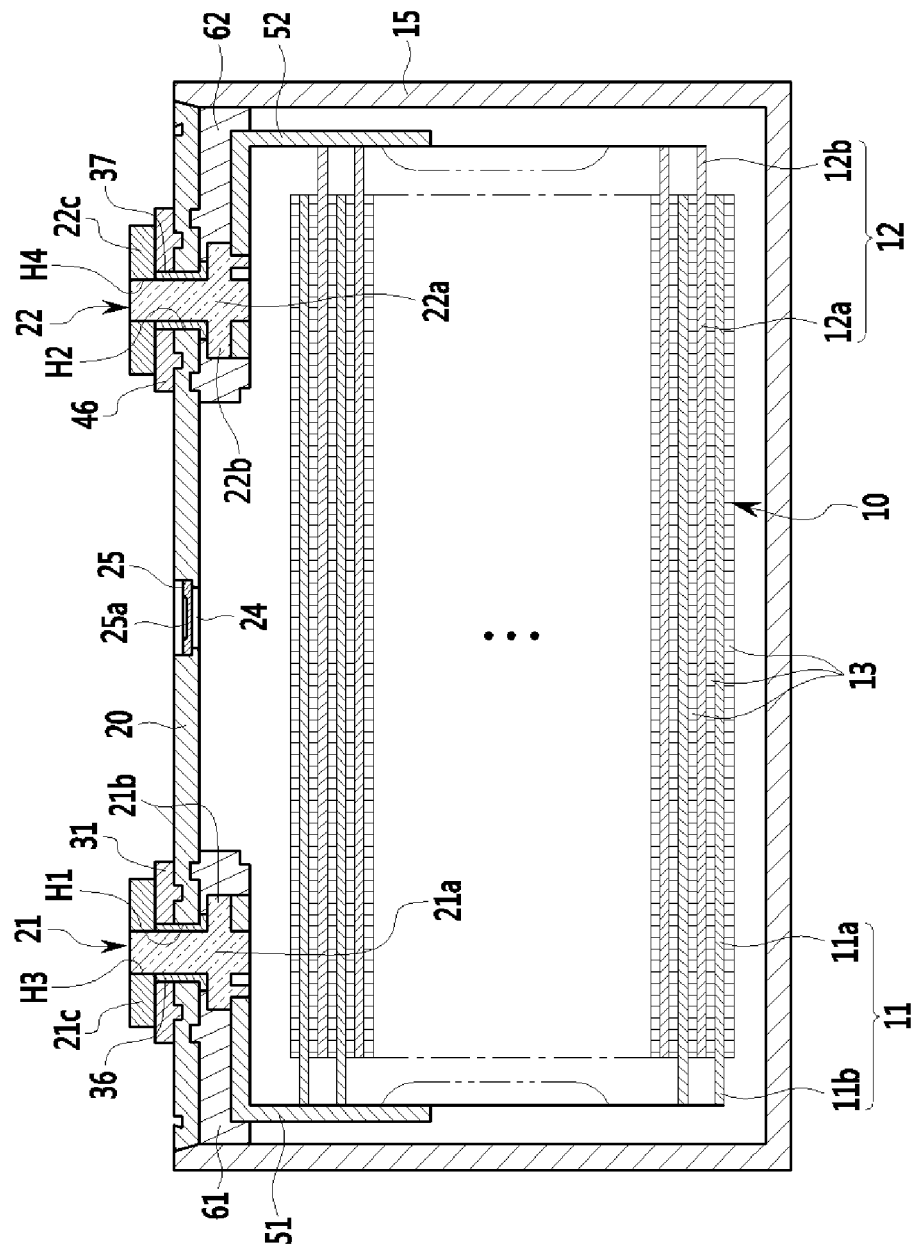
FIG. 2 is a cross-sectional view illustrating the rechargeable battery taken along line II-II of FIG. 1.

FIG. 1 is a perspective view illustrating a rechargeable battery according to a first exemplary embodiment of the present invention, and FIG. 2 is a cross-sectional view illustrating the rechargeable battery taken along line II-II of FIG. 1. Referring to FIGS. 1 and 2, a rechargeable battery according to the first exemplary embodiment includes an electrode assembly 10 that charges and discharges a current, a case 15 that houses the electrode assembly 10 and an electrolyte solution, a cap plate 20 that is coupled to an opening of the case 15, and electrode terminals 21 and 22 that are installed at the cap plate 20.

For example, the electrode assembly 10 is formed by disposing electrodes (e.g., a negative electrode 11 and a positive electrode 12) at respective surfaces of a separator 13, which is an insulator, and by spirally-winding the negative electrode 11, the separator 13, and the positive electrode 12 in a jelly roll state.

The negative electrode 11 and the positive electrode 12 respectively include coated regions 11a and 12a at which an active material is applied to a current collector made of a metal plate, and uncoated regions 11b and 12b, respectively, that are formed with an exposed current collector because an active material is not applied thereto.

The uncoated region 11b of the negative electrode 11 is formed in an end portion of one side of the negative electrode 11 along the spiral-wound negative electrode 11. The uncoated region 12b of the positive electrode 12 is formed in an end portion of one side of the positive electrode 12 along the spiral-wound positive electrode 12. That is, the uncoated regions 11b and 12b are disposed at opposite ends of the electrode assembly 10.

The case 15 is formed in an approximate cuboid shape to set a space that houses the electrode assembly 10 therein. An opening of the case 15 is formed at one side of the cuboid to enable the electrode assembly 10 to be inserted from the outside to the internal space.

The cap plate 20 is coupled by force fitting it to the opening of the case 15 and welding it to close and seal the case 15. For example, the case 15 and the cap plate 20 are made of aluminum to be welded to each other. That is, after the electrode assembly 10 is inserted into the case 15, the cap plate 20 is welded to an opening of the case 15.

Further, the cap plate 20 has at least one opening and has, for example, terminal holes H1 and H2 and a vent hole 24. The electrode terminals 21 and 22 are installed in the terminal holes H1 and H2, respectively, of the cap plate 20 to be electrically connected to the electrode assembly 10.

That is, the electrode terminals 21 and 22 are electrically connected to the negative electrode 11 and the positive electrode 12, respectively, of the electrode assembly 10. Therefore, the electrode assembly 10 is drawn outside of the case 15 through the electrode terminals 21 and 22.

The electrode terminals 21 and 22 include plate terminals 21c and 22c that are disposed at the outside of the cap plate 20 to correspond to the terminal holes H1 and H2, and rivet terminals 21a and 22a that are electrically connected to the electrode assembly 10 and that are fastened to the plate terminals 21c and 22c by penetrating the terminal holes H1 and H2, respectively.

The plate terminals 21c and 22c have through-holes H3 and H4, respectively. The rivet terminals 21a and 22a penetrate the terminal holes H1 and H2 at an upper end portion to be inserted into the through-holes H3 and H4. The electrode terminals 21 and 22 further include flanges 21b and 22b that are integrally widely formed in the rivet terminals 21a and 22a, respectively, at the inside of the cap plate 20.

At the electrode terminal 21 side that is connected to the negative electrode 11, an external insulation member 31 is interposed between the plate terminal 21c and the cap plate 20 to electrically insulate the plate terminal 21c and the cap plate 20. That is, the cap plate 20 maintains a state that it is insulated from the electrode assembly 10 and the negative electrode 11.

By riveting or welding an upper end portion and coupling the insulation member 31 and the plate terminal 21c to the upper end portion of the rivet terminal 21a, the insulation member 31 and the plate terminal 21c are fastened to the upper end portion of the rivet terminal 21a. The plate terminal 21c is installed at the outside of the cap plate 20 with the insulation member 31 interposed therebetween.

At the electrode terminal 22 side that is connected to the positive electrode 12, a conductive top plate 46 is interposed between the plate terminal 22c and the cap plate 20 to electrically connect the plate terminal 22c and the cap plate 20. That is, the cap plate 20 maintains a state that it is electrically connected to the electrode assembly 10 and the positive electrode 12.

By riveting or welding an upper end portion and coupling the top plate 46 and the plate terminal 22c to the upper end portion of the rivet terminal 22a, the top plate 46 and the plate terminal 22c are fastened to the upper end portion of the rivet terminal 22a. The plate terminal 22c is installed at the outside of the cap plate 20 with the top plate 46 interposed therebetween Gaskets 36 and 37 are installed between the rivet terminals 21a and 22a of the electrode terminals 21 and 22 and an inner surface of the terminal holes H1 and H2, respectively, of the cap plate 20, to seal and electrically insulate between the rivet terminals 21a and 22a and the cap plate 20, respectively.

The gaskets 36 and 37 are further extended between the flanges 21b and 22b and the inside of the cap plate 20 to further seal and electrically insulate between the flanges 21b and 22b and the cap plate 20. That is, by installing the electrode terminals 21 and 22 in the cap plate 20, the gaskets 36 and 37 prevent an electrolyte solution from leaking through the terminal holes H1 and H2.

Lead tabs 51 and 52 electrically connect the electrode terminals 21 and 22 to the negative electrode 11 and the positive electrode 12, respectively, of the electrode assembly 10. That is, by caulking a lower end portion by coupling the lead tabs 51 and 52 to the lower end portion of the rivet terminals 21a and 22a, while the lead tabs 51 and 52 are supported to the flanges 21b and 22b, the lead tabs 51 and 52 are connected to the lower end portion of the rivet terminals 21a and 22a, respectively.

Insulation members 61 and 62 are each installed between the lead tabs 51 and 52 and the cap plate 20 to electrically insulate the lead tabs 51 and 52 and the cap plate 20. Further, the insulation members 61 and 62 are coupled to the cap plate 20 at one side and enclose the lead tabs 51 and 52, the rivet terminals 21a and 22a, and the flanges 21b and 22b at the other side, thereby stabilizing a connection structure thereof.

In order to discharge an internal pressure and a generated gas of the rechargeable battery, the vent hole 24 is closed and sealed with a vent plate 25. When an internal pressure of the rechargeable battery arrives at a predetermined pressure, the vent plate 25 is cut out to open the vent hole 24. The vent plate 25 has a notch 25a that induces the cutout.

Figure 3:
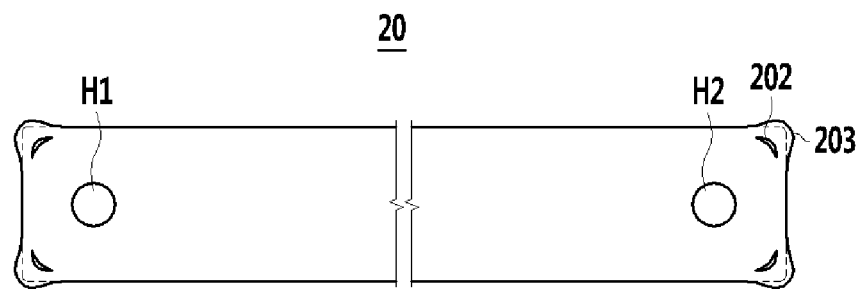
FIG. 3 is a top plan view illustrating a cap plate before assembling the cap plate in a case.
Figure 4:
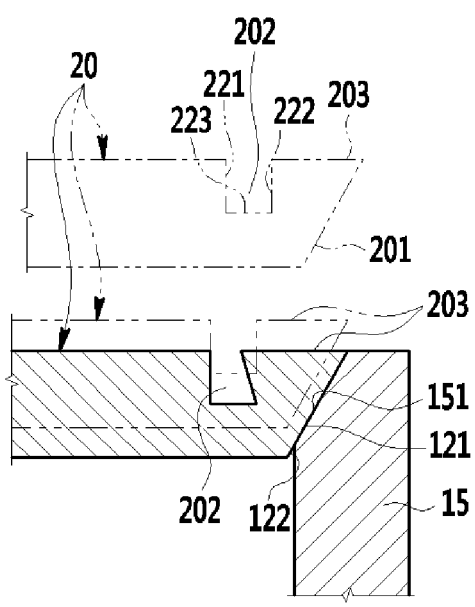
FIG. 4 is a cross-sectional view illustrating a process of assembling a cap plate in an opening of a case.

FIG. 3 is a top plan view illustrating a cap plate before assembling a cap plate in a case, and FIG. 4 is a cross-sectional view illustrating a process of assembling a cap plate in an opening of a case. Referring to FIGS. 3 and 4, the cap plate 20 includes an inclined portion 201 that is formed at a side surface of an outer edge forming a circumference, and a modified groove 202 that is formed at a corner of an outer surface thereof.

The inclined portion 201 forms an area of an inner surface of the cap plate 20 to be smaller than an opening area of the case 15, and forms an area of an outer surface of the cap plate 20 to be larger than an opening area. Therefore, the inclined portion 201 enables the cap plate 20 to be naturally installed in an opening and prevents the cap plate 20 from falling to the inside of the case 15. That is, the inclined portion 201 induces reception of the cap plate 20 to an opening of the case 15.

When the cap plate 20 is coupled by force fitting to the opening of the case 15, while a groove gap of the modified groove 202 reduces, the cap plate 20 is coupled to the opening with the inclined portion 201. In this case, the opening of the case 15 is modified by pressing of the inclined portion 201 to form a corresponding modified inclined surface 151. That is, the inclined portion 201 of the cap plate 20 is forcibly fitted to the corresponding modified inclined surface 151 of the case 15.

The inclined portion 201 and the corresponding modified inclined surface 151 eliminate a separate process for the opening of the case 15. That is, as a number of processes of the case 15 is reduced, production cost can be reduced.

For example, the modified groove 202 may be provided at four locations of a quadrangle corner of the cap plate 20. Before coupling the cap plate 20 to the case 15, the modified groove 202 has a structure that maximally forms a groove gap at the center of the corner and that minimally forms a groove gap at both sides, and that gradually reduces a groove gap while advancing to both sides from the center.

The cap plate 20 may further have a protruding portion 203 corresponding to a groove gap at an outer edge of the modified groove 202. The protruding portion 203 has a structure corresponding to the modified groove 202, and before coupling the cap plate 20 to the case 15, the protruding portion 203 has a structure that forms a greater groove gap at the center of a corner and that forms a smaller groove gap at both sides, and that gradually reduces a groove gap while advancing to both sides from the center.

Figure 5:
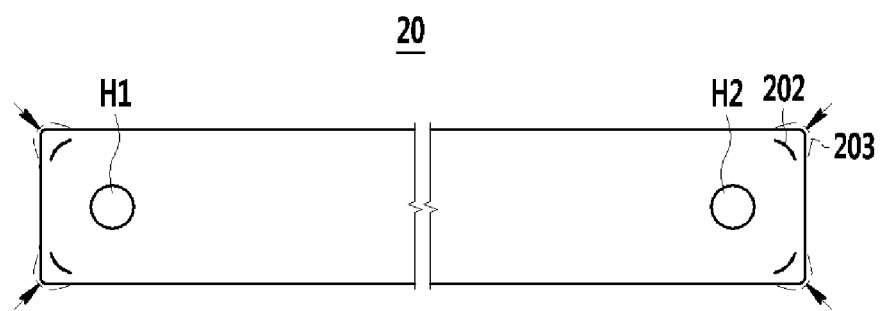
FIG. 5 is a top plan view illustrating a cap plate after assembling the cap plate in a case, as shown in FIG. 4.

FIG. 5 is a top plan view illustrating a cap plate after assembling the cap plate in a case, as shown in FIG. 4. Referring to FIGS. 4 and 5, when forced fitting the cap plate 20 to the opening of the case 15, as a groove gap of the modified groove 202 reduces, the protruding portion 203 of the cap plate 20 may be inserted into the opening of the case 15.

In a state in which the cap plate 20 is coupled to the case 15, an opening of the case 15 has a corresponding modified inclined surface 151 that is obliquely modified to correspond to the inclined portion 201. Therefore, the inclined portion 201 of the cap plate 20 surface contacts the corresponding modified inclined surface 151 of the opening of the case 15.

Further, the modified groove 202 of the cap plate 20 includes a first internal side wall 221, a second internal side wall 222, and a bottom portion 223 that are formed opposite at the inside and the outside at an outer surface. The bottom portion 223 connects the bottom of the first internal side wall 221 and the second internal side wall 222.

For example, the modified groove 202 may orthogonally form the first and second internal side walls 221 and 222 based on the bottom portion 223. When inserting the cap plate 20 into the opening of the case 15, an orthogonal structure of the second internal side wall 222 and the bottom portion 223 induces bending of the inclined surface 201 of the cap plate 20 to enable easier reduction of a groove gap of the modified groove 202.

In the cap plate 20, the inclined portion 201 is produced in a straight line to be modified when coupling to the opening of the case 15, and forms a first inclined portion 121 that is located at the outer surface side and a second inclined portion 122 that is located at the inner surface side.

The first inclined portion 121 is bent to correspond to an intersection of the second internal side wall 222 and the bottom portion 223 to closely contact the opening. In this case, while forming the corresponding modified inclined surface 151 by modifying the opening, the first inclined portion 121 is forcibly fitted.

Figure 6:
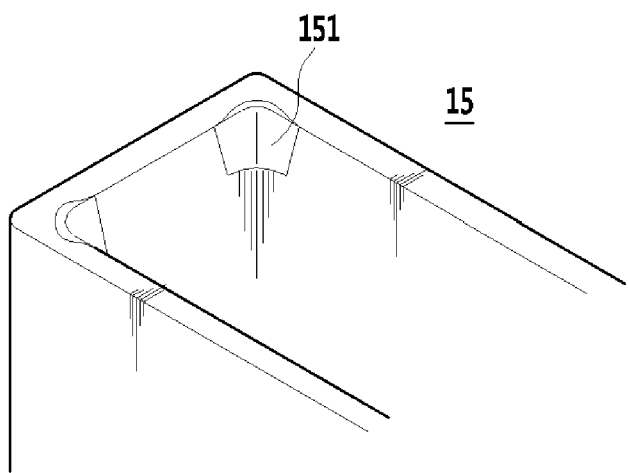
FIG. 6 is a perspective view illustrating a case after assembling a cap plate in the case, as shown in FIG. 4.

FIG. 6 is a perspective view illustrating a case after assembling a cap plate in the case, as shown in FIG. 4. Referring to FIG. 6, in the opening of the case 15, the corresponding modified inclined surface 151 is formed to correspond to the first inclined portion 121.

Referring again to FIG. 4, the second inclined portion 122 is bending-connected to the first inclined portion 121 to be separated from an inner wall surface of the case 15. The second inclined portion 122 may be formed or may not be formed according to a thickness of the cap plate 20.

In this way, because the inclined portion 201 of the cap plate 20 is forcibly fitted to be welded while forming the corresponding modified inclined surface 151 in the opening of the case 15, coupling and welding performance of the case 15 and the cap plate 20 can be improved.

Hereinafter, a second exemplary embodiment of the present invention will be described. In the following description, constituent elements identical to or corresponding to those of a first exemplary embodiment will be omitted, and only dissimilar constituent elements will be described.

Figure 7:
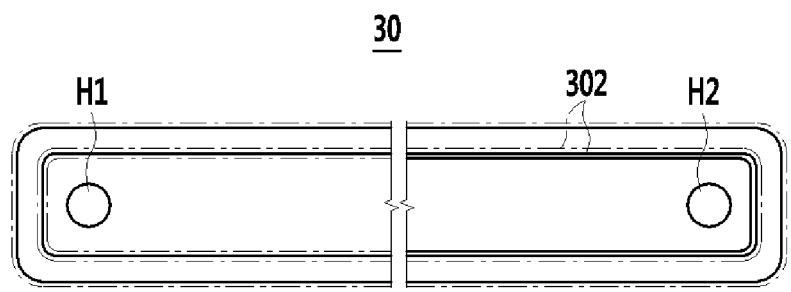
FIG. 7 is a top plan view illustrating a cap plate before and after assembling the cap plate in a case of a rechargeable battery according to a second exemplary embodiment of the present invention.
Figure 8:
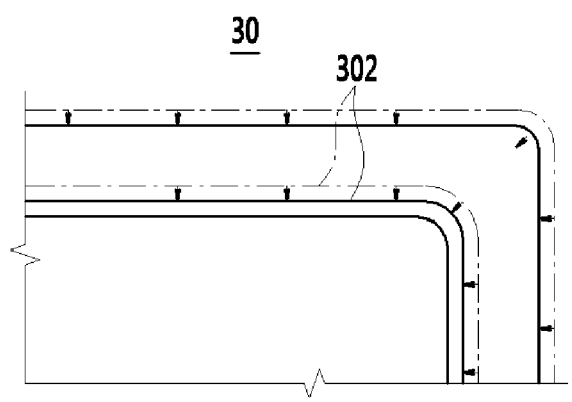
FIG. 8 is a partial enlarged view of FIG. 7.
Figure 9:
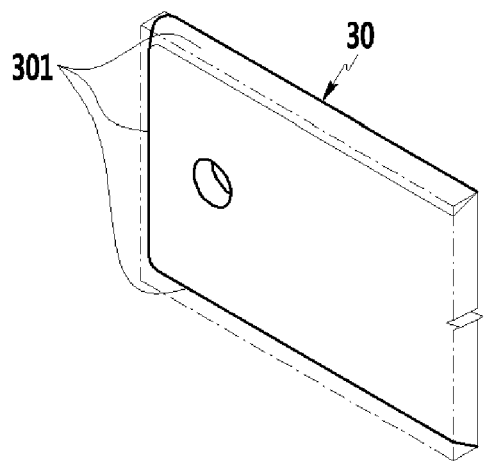
FIG. 9 is a partial perspective view illustrating a portion of a cap plate after assembling the cap plate in a case, as shown in FIG. 7.
Figure 10:
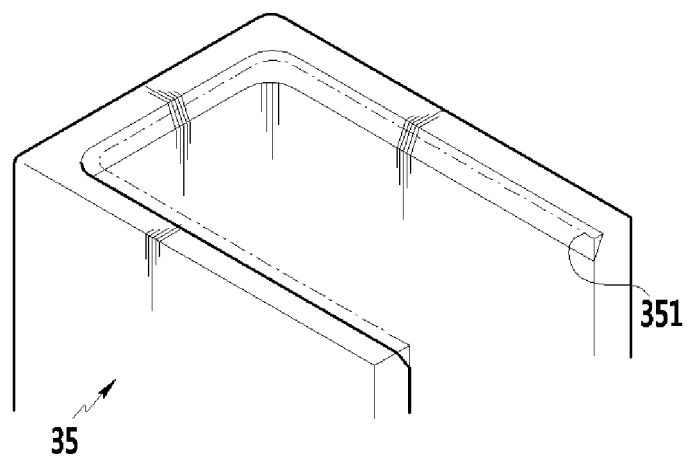
FIG. 10 is a partial perspective view illustrating a portion of a case after assembling a cap plate in the case, as shown in FIG. 7.

FIG. 7 is a top plan view illustrating a cap plate before and after assembling the cap plate in a case of a rechargeable battery according to a second exemplary embodiment of the present invention, FIG. 8 is a partial enlarged view of FIG. 7, FIG. 9 is a partial perspective view illustrating a portion of a cap plate after assembling the cap plate in a case, as shown in FIG. 7, and FIG. 10 is a partial perspective view illustrating a portion of a case after assembling a cap plate in the case, as shown in FIG. 7.

Referring to FIGS. 7 to 9, an inclined portion 301 of a cap plate 30 may be formed at an entire side surface of an outer edge of the cap plate 30. In this case, a modified groove 302 that is formed at an outer surface of the cap plate 30 is formed along an entire circumference of the cap plate 30. That is, the inclined portion 301 induces reception of the cap plate 30 in an entire opening of the case 35.

When the cap plate 30 is coupled by forced fitting to an opening of the case 35, while a groove gap of the modified groove 302 is reduced at an entire circumference, the cap plate 30 is coupled to the opening with the inclined portion 301 (see FIGS. 7 and 8). In this case, the opening of the case 35 is modified by pressing of the inclined portion 301 to form the corresponding modified inclined surface 351 (see FIG. 10). That is, the inclined portion 301 of the cap plate 30 is forcibly fitted to the corresponding modified inclined surface 351 of the case 35.

The opening of the case 35 has the corresponding modified inclined surface 351 that is obliquely modified to correspond to the inclined portion 301. The corresponding modified inclined surface 351 is formed along an entire circumference of the opening.

Therefore, the inclined portion 301 of the cap plate 30 surface contacts the corresponding modified inclined surface 351 at an entire circumference of the opening of the case 35.

The inclined portion 301 is formed at an entire circumference of the cap plate 30, and the corresponding modified inclined surface 351 is formed at an entire opening circumference of the case 35 and thus the inclined portion 301 and the corresponding modified inclined surface 351 surface contact, thereby further improving coupling and welding performance of the case 35 and the cap plate 30.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
   a case that houses an electrode assembly;
   a cap plate that is coupled to an opening of the case; and
   an electrode terminal that is electrically connected to the electrode assembly to be provided in the cap plate,
   wherein the cap plate has an inclined portion at a side surface of an outer edge and a modified groove at a corner of an outer surface and is coupled to the opening with the inclined portion so that the modified groove has an inclined inner wall that corresponds to the inclined surface of the cap plate.

2. The rechargeable battery of claim 1, wherein the modified groove is provided at four locations of a quadrangle corner of the cap plate.

3. The rechargeable battery of claim 1, wherein the modified groove forms a greater groove gap at the center of the corner, forms a smaller groove gap at both sides, and gradually reduces a groove gap while advancing to both sides from the center, before coupling.

4. The rechargeable battery of claim 3, wherein the cap plate further comprises a protruding portion corresponding to the groove gap at an outer edge of the modified groove.

5. The rechargeable battery of claim 4, wherein the protruding portion is inserted into an opening of the case so that the modified groove becomes narrow.

6. The rechargeable battery of claim 5, wherein the opening of the case has a corresponding modified inclined surface that is obliquely modified to correspond to the inclined portion.

7. The rechargeable battery of claim 1, wherein the modified groove comprises:
   a first internal side wall and second internal side wall that are formed opposite at the inside and the outside at the outer surface; and
   a bottom portion that connects the bottom of the first internal side wall and the second internal side wall.

8. The rechargeable battery of claim 7, wherein the inclined portion forms a first inclined portion that is produced in a straight line and that is bent to correspond to an intersection of the first internal side wall and the bottom portion when coupling to the opening to closely contact the opening and a second inclined portion that is bending-connected to the first inclined portion to be separated from the opening.

9. The rechargeable battery of claim 1, wherein the inclined portion is formed at an entire side surface of an outer edge of the cap plate.

10. The rechargeable battery of claim 9, wherein the modified groove is formed along an entire circumference of the outer surface.

11. The rechargeable battery of claim 10, wherein the opening of the case has a corresponding modified inclined surface that is obliquely modified to correspond to the inclined portion.

12. The rechargeable battery of claim 11, wherein the corresponding modified inclined surface is formed along an entire circumference of the opening.

* * * * *